US006990927B2

(12) United States Patent  (10) Patent No.: US 6,990,927 B2
Axelrod  (45) Date of Patent: Jan. 31, 2006

(54) COLLAPSIBLE PET TREAT (75) Inventor: Glen S. Axelrod, Colts Neck, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 0 days.

(21) Appl. No.: 10/873,941

(22) Filed: Jun. 22, 2004

(65) Prior Publication Data

US 2006/0000424 A1  Jan. 5, 2006

(51) Int. Cl.
*A01K 29/00* (2006.01)

(52) U.S. Cl. ................................ 119/707; 119/709

(58) Field of Classification Search ............... 119/707, 119/709, 710, 711; D30/160; 446/71, 72, 446/73, 80; 403/43, 52, 53
See application file for complete search history.

(56) References Cited

U.S. PATENT DOCUMENTS

| | | | |
|---|---|---|---|
| 2,602,755 A | 7/1952 | Silvernail | |
| 2,630,342 A * | 3/1953 | Gilmont | 403/53 |
| 3,038,895 A | 6/1962 | Rutenberg et al. | 260/233.3 |
| 3,074,803 A | 1/1963 | Mcgowan et al. | 106/38.5 |
| 3,117,014 A | 1/1964 | Klug et al. | 106/213 |
| 3,137,592 A | 6/1964 | Protzman et al. | |
| 4,076,846 A | 2/1978 | Nakatsuka et al. | 426/62 |
| 4,673,438 A | 6/1987 | Wittwer et al. | 106/126 |
| 4,738,724 A | 4/1988 | Wittwer et al. | 106/213 |
| 5,405,564 A | 4/1995 | Stepto et al. | 264/115 |
| 5,476,069 A | 12/1995 | Axelrod | 119/709 |
| 5,827,565 A | 10/1998 | Axelrod | 426/623 |
| D407,869 S * | 4/1999 | Wang | D30/160 |
| 5,941,597 A | 8/1999 | Horiuchi et al. | 296/203.01 |
| 5,947,061 A * | 9/1999 | Markham | 119/70 |
| 6,067,941 A | 5/2000 | Axelrod | 119/707 |
| 6,093,427 A | 7/2000 | Axelrod | 426/104 |
| 6,093,441 A | 7/2000 | Axelrod | 426/632 |
| 6,098,571 A | 8/2000 | Axelrod et al. | 119/707 |
| 6,110,521 A | 8/2000 | Axelrod | 426/549 |
| 6,126,978 A | 10/2000 | Axelrod | 426/285 |
| 6,159,516 A | 12/2000 | Axelrod | 426/456 |
| 6,180,161 B1 | 1/2001 | Axelrod | 426/623 |
| 6,274,182 B1 | 8/2001 | Axelrod et al. | 426/132 |
| 6,427,634 B1 * | 8/2002 | Mann | 119/709 |
| 6,586,007 B2 | 7/2003 | Lake, Jr. et al. | 424/486 |
| 2003/0077109 A1 * | 4/2003 | Chen | 403/52 |
| 2003/0172879 A1 * | 9/2003 | Bader | 119/709 |
| 2003/0205206 A1 * | 11/2003 | Natale et al. | 119/709 |
| 2004/0200434 A1 * | 10/2004 | Shatoff et al. | 119/707 |

* cited by examiner

*Primary Examiner*—Teri Pham Luu
*Assistant Examiner*—Elizabeth Shaw
(74) *Attorney, Agent, or Firm*—Grossman, Tucker, Perreault & Pfleger PLLC

(57) ABSTRACT

A pet toy having projecting portions and a method of making such is provided. The toy may be molded in a collapsed or dissembled position for packaging, shipping and storage and expanded or assembled for access by an animal. One embodiment of the invention comprises complimentary joint regions in which one or more legs may move relative to a base portion.

7 Claims, 5 Drawing Sheets

COLLAPSIBLE PET TREAT

FIELD OF THE INVENTION

This invention relates to molded pet toys and, more particularly, to molded dog chews which can be packaged to reduce the space required for storage and shipping, and the method of manufacturing such product. In addition, the invention relates to the use of a dog bone configuration that can be assembled from component parts.

BACKGROUND OF THE INVENTION

Most dogs enjoy chewing on things, although preferences vary as to the hardness of the substances favored. Some dogs like to chew on very hard materials such as cow bones, wood and nylon, while others prefer softer chews such as polyurethane or rubber. Still others favor freeze dried snacks. Some dogs due to their age, may not be able to chew on very hard substances. Young dogs may have insufficiently developed teeth, while old dogs may have diseased gums or may have lost some of their teeth.

Many indigestible objects are given to dogs as a chew and although the dogs may enjoy chewing thereon, the objects are often swallowed in whole or in part. Once swallowed, these objects or fragments thereof may have an adverse effect on the dog's digestion and may become impacted in the dog's intestinal tract with life-threatening consequences. By way of example, dog chews have been marketed which utilize an ethylene copolymer which can be fractured by the chewing action of a dog, and when ingested can block the dog's stomach passages.

Other edible dog chews have been marketed which have a comparatively short shelflife and therefore must be replaced by retail outlets at frequent intervals. Yet other prior art dog chews are lacking in structural integrity whereby they are susceptible to breakage during handling and shipping.

The prior art is replete with disclosures directed at converting starch or related materials into a molded or shaped article. The following discussion therefore provides a brief chronological overview of the development of such technology as it has appeared in the patent literature over the past several decades.

For example, starting with U.S. Pat. No. 2,602,755 (1952), entitled "Thermoplastic Compositions of Water-Soluble Cellulose Ethers" it was disclosed that powdered methyl cellulose of a water soluble variety could be blended with a particular narrow range of mixtures of propylene glycol and glycerin to provide compositions which could be molded or extruded when pressure was applied at temperatures of 150 degrees to 170 degrees C., without decomposition. This was then followed by U.S. Pat. No. 3,137,592 (1961), entitled "Gelatinized Starch Products" which described a method of preparing homogenous gelatinized starch products, which method was characterized by intense mechanical working or shearing of the starch at elevated temperatures and pressures in the presence of a minor-proportion of a starch-swelling agent. The method goes on to disclose the use of a screw-type extruder, along with water as the preferred starch-swelling agent or plasticizer due to its low cost and relatively low boiling point.

Attention is next directed at U.S. Pat. No. 3,038,895 (1962), entitled "Water-Dispersible Partially Substituted Derivatives of Amylose" which describes a means for producing an amylose derivative which was readily dispersed in water without the need to exceed temperatures above 130 degrees C., which dispersion was identified as "viscosity stable", thereby forming films of excellent water resistance. Shortly thereafter, in U.S. Pat. No. 3,074,803 (1963), entitled "Molding Starch Composition", a method was disclosed for preparing molded starch compositions, which method focused on the blending of high melting point fatty acid esters with starch which blends are then said to provide a composition relatively free of oil build-up along with what was said to be a minimum of starch dusting.

This was followed by U.S. Pat. No. 3,117,014 (1964), entitled "Amlaceous Compositions for Shaped Articles and Process" which described starch compositions which are said to flow under heat and pressure which compositions comprise a derivative of amylaceous material, a plasticizer for said derivative, and water, wherein the amount of water is between 1.0–20% by weight. Turning next to U.S. Pat. No. 4,076,846 (1978), entitled "Protein-Starch Binary Molding Composition and Shaped Articles Obtained. Therefor" an edible, water-soluble thermoplastic molding composition comprising a starch material is disclosed, along with a neutral inorganic alkali salt of protein material, water, an edible plasticizer, an edible lubricant, and other additives. Such compositions were said to have excellent moldability and processibility when subjected to various common plastics processing techniques, such as compression molding, transfer molding, extrusion molding, blow molding, inflation molding, injection molding, vacuum forming, pressuring forming, heat sealing, etc.

More recent disclosures include U.S. Pat. No. 4,673,438 (1987), entitled "Polymer Compositions and Injection Molding". This disclosure states that capsules and other shaped products can be formed from a starch composition comprising starch, with a molecular mass range of 10,000 to 20,000 Daltons, along with a water content from 5–30% by weight. The recited process using an injection molding machine requires that one maintain a starch/water composition at a water content of 5–30% by weight of the composition under controlled conditions of temperature and pressure, heating said starch/water composition at elevated pressure above its glass transition temperature and melting point while maintaining said water content to form a melt, further heating and plasticizing said molten starch/water composition to dissolve the starch in the water to form what is stated to be an essentially molecularly dispersed solution of the melt. This is followed by injecting the starch/water melt into a mold cavity while maintaining a predetermined water content, and cooling the composition in the mold to form a molded product at a temperature below the glass transition temperature of the composition and ejecting the molded product from the mold.

In U.S. Pat. No. 4,738,724 (1988), entitled "Method for Forming Pharmaceutical Capsules from Starch Compositions" injection molded capsules of starch are disclosed, for pharmaceutical applications, which method, similar to the '438 patent discussed above, recites that one first provide a starch/water mixture having a water content in the range of about 5% to 30% by weight based on the weight of starch and water. This is followed by heating the starch/water composition at elevated temperatures above its glass transition temperature and melting point while maintaining the water content to form a melt, followed by further heating and plasticizing said molten starch-water composition to dissolve the starch in the water followed by injection molding of the plasticized starch at elevated temperature and pressure into a mold, and forming a multi-chambered configuration, and ejecting the molded capsule from the mold.

U.S. Pat. No. 5,405,564 (1995), entitled "Method of Forming Shaped Articles From Pre-Processed Starch" recites a process of forming shaped articles from starch. The method is described as having surprisingly established that in the process of injection molding starch, there are two important steps that are preferably separated. That is, this disclosure recites that one must first heat a starch/water mixture wherein the water content is about 10% to about 20% by weight with respect to that of said starch, in a closed volume to a temperature within the range of about 120 degrees C. to about 190 degrees C. at a pressure corresponding to the vapor pressure of water at the used temperature and up to about 150 times 10 sup. 5 N/m. sup. 2, to form a melt, wherein said melt is extruded and cooled to a solidified and granulated product. This is then followed by heating such solid starch composition, wherein the water content of said solid composition is about 10% to about 20% by weight with respect to that of said starch, in the screw barrel of an injection molding machine or an extruder, at a temperature of from about 80 degrees C. to about 200 degrees C., and at a pressure of from about zero to about 150 times 10 sup. 5 N/m sup. 2 for a time long enough to form what is termed as a melt of destructurized starch, transferring said melt of destructurized starch to a mold or extruding said melt of destructurized starch while maintaining the water content in the range of from about 10% to about 20% by weight with respect to that of the composition, and cooling said melt of destructurized starch in said mold or outside said extruder to form a solid shaped article.

Attention is also directed to the following United States Patents and copending applications, commonly owned by the assignee of the present invention and included herein by reference: U.S. Pat. No. 5,476,069; U.S. Pat. No. 6,093,427 entitled "Vegetable Based Dog Chew"; U.S. Pat. No. 5,827,565 entitled "Edible Dog Chew"; U.S. Pat. No. 5,941,597 entitled "Carrot-Based Dog Chew"; U.S. Pat. No. 6,180,161 filed Jul. 14, 1998 entitled "Heat Modifiable Edible Dog Chew"; U.S. Pat. No. 6,126,978 entitled "Improved Edible Dog Chew"; U.S. Pat. No. 6,110,521 entitled "Wheat & Casein Dog Chew With Modifiable Texture"; U.S. Pat. No. 6,093,441 entitled "Heat Modifiable Peanut Dog Chew"; U.S. Pat. No. 6,159,516 entitled "Method of Molding Edible Starch"; U.S. Pat. No. 6,586,007 entitled "Health Chew Toy"; U.S. Pat. No. 6,274,182, entitled "Animal Chew"; U.S. Pat. No. 6,067,941 entitled "Animal Chew" and U.S. Pat. No. 6,098,571 entitled "Treat Dispensing Toy".

In addition to starch and vegetable-containing dog chews, plastics such as polyurethane, nylon and others may also be molded for form items for dogs to chew on.

Pet toys such as dog chews may be produced in the form of strips or toys or even bone shapes, generally having a larger end and smaller shaft to allow the dog to easily pick them up. Dogs generally will hold a dog chew between their paws in order to chew it and this requires easy access to the chew to maintain interest.

Therefore, dog chews may be provided which due to their molded shape stand on a base with at least one leg extending upward for easy access by the dog. These shapes may comprise multiple extensions or legs some of which may also serve as the base. While shapes of these types are more easily accessed by the dog, they are expensive to tool and hardly efficient for packaging and shipping. The nesting density of the chews, especially if packaged individually, is quite low making costs high.

Accordingly, a need exists for an improved pet toy or dog chew design which can either be molded in a collapsed state and expanded when purchased, molded in an expanded shape then collapsed for storage and shipping and expanded when ready for use, or which may be assembled from separately molded components optionally prepared from different compositions or flavors that can be engaged into a base.

SUMMARY OF THE INVENTION

The present invention is directed at a collapsible and/or expandable dog chew and the method of manufacturing such product. The dog chew is molded in successive steps using resins which are preferably incompatible with one another and do not substantially adhere. The multiple resins are used to form adjacent sections of a joint having a multiplicity of designs wherein one portion of the joint molded of a first material may be made to move relative to another portion of the joint made of a second incompatible material.

The incompatibility of the resins may be due to chemical differences (polar/non-polar), processing regimen (a large difference in melt temperatures) or due to an abherent applied to the first portion of the joint before the formation of the second portion of the joint.

The type of joint used may be any of the type where two surfaces interface and stay in contact at least partially due to their molded shape. This may include, but is not limited to, ball and socket, ring and shaft, rotary joint, etc. These joints may further include the engagement of toothed sections on each portion of the joint which may act as a detent to position one portion of the joint in relation to the second portion of the joint and require some level of force to change the relative position of the portions of the joint. Thus, a dog chew having, for instance, three legs extending from a base may be molded in a flat configuration and when intended for use may be articulated or "unfolded" to form a dog chew.

Alternatively, the toy or chew may be molded in an expanded condition and after demolding be folded into a flat plane for packaging, storage, and shipping.

It is therefore an object of the present invention to provide a pet toy such as a dog chew that can be collapsed and/or expanded for storage, shipping and use.

It is a further object to provide a process for molding a collapsible/expandable pet toy or dog chew.

It is a still further object to provide an articulating pet toy which requires substantially less space to store and ship then when in use.

It is also an object to provide a three-dimensional pet chew from separately molded components optionally prepared from different compositions or flavors that can be engaged into a base.

Other features and advantage of the present invention will become apparent from the following detailed description taken in conjunction with the accompanying drawings which illustrate by way of example the principles of the invention.

DESCRIPTION OF THE INVENTION

For elements common to the various embodiments of the invention, the numerical reference character between the embodiments is held constant, but distinguished by the addition of an alphanumeric character to the existing numerical reference character. In other words, for example, an element referenced at 10 in the first embodiment is correspondingly referenced at 10A, 10B, and so forth in subsequent embodiments. Thus, where an embodiment description uses a character to refer to an element, the reference character applies equally, as distinguished by alphanumeric character, to the other embodiments where the element is common.

DETAILED DESCRIPTION OF THE PREFERRED EMBODIMENTS

As noted above, the present invention is directed at a pet toy, for instance, a dog chew, which may be molded in an unextended or collapsed state to reduce processing, packaging and shipping costs, yet may be expanded through one or more articulating joints to provide an article which is easy for a dog to access and chew on.

Figure 1:
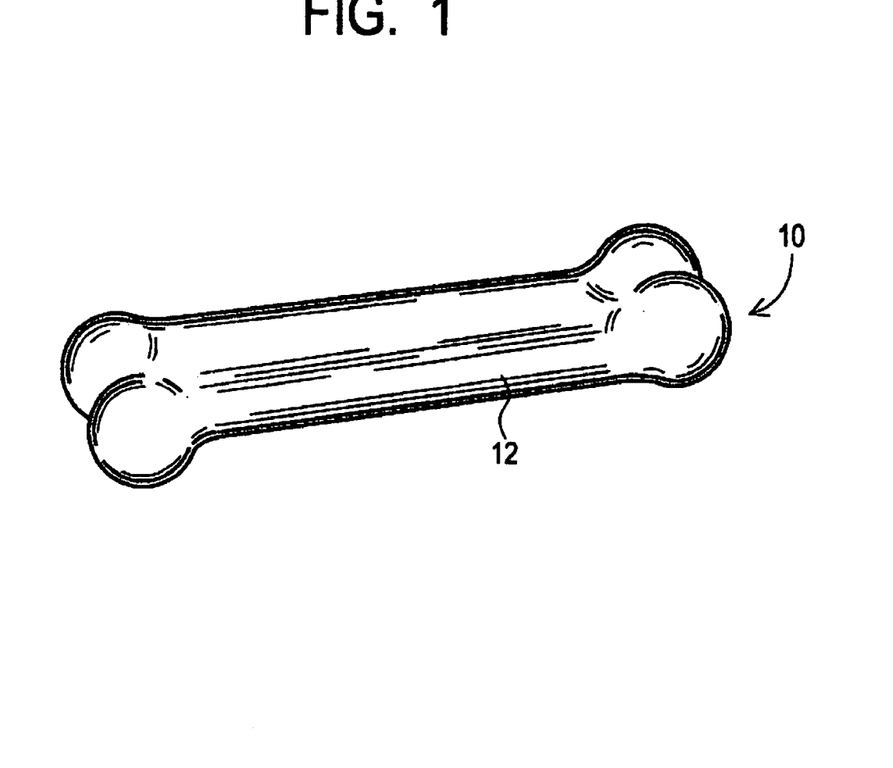
FIG. 1 illustrates a pet toy or edible chew known in the prior art.
Figure 2:
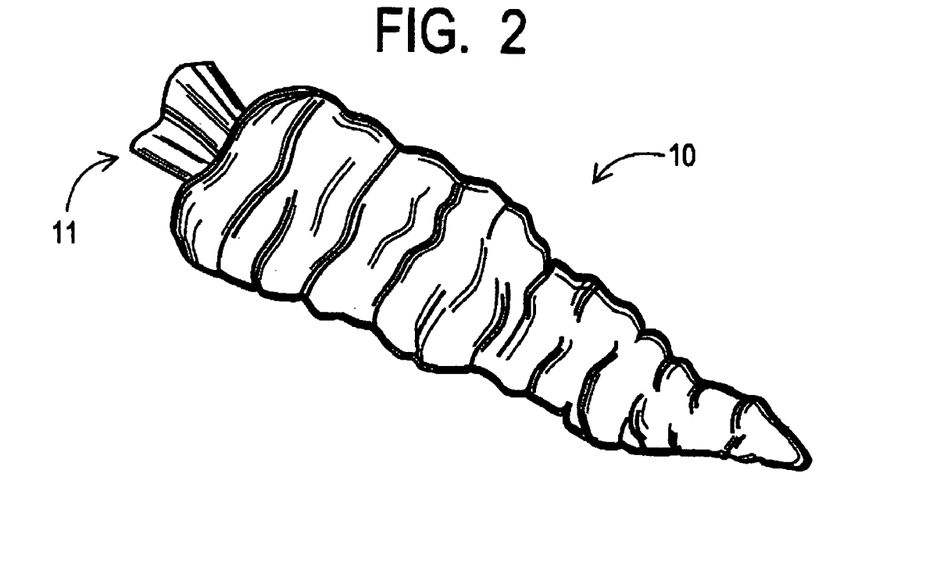
FIG. 2 illustrates an alternate configuration of an edible dog chew known in the prior art.

FIGS. 1 and 2 illustrate typical examples of toys that dogs may chew on, shaped like a bone or carrot. These are relatively flat shapes, illustrated at 10 with a smaller portion indicated at 12 in FIG. 1 and at 11 in FIG. 2 which allows the dog to pick up the toy. However, the dog must prop up one end of the toy on a paw or on another raised surface in order to get the toy in a position along the dog's jaw for serious chewing and enjoyment.

Figure 3:
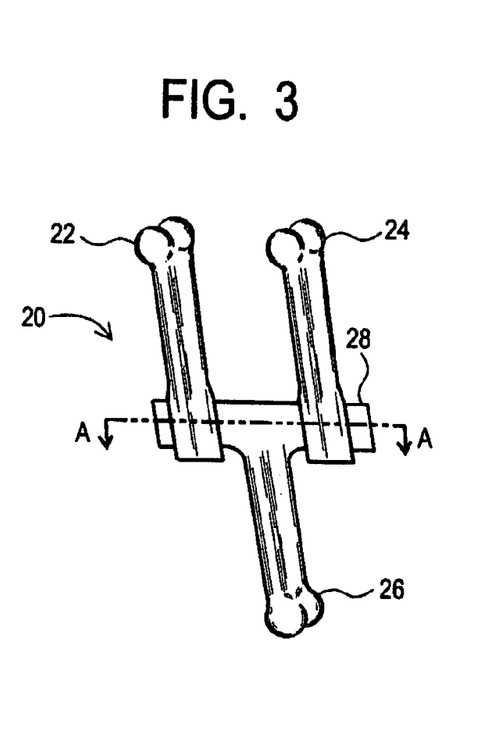
FIG. 3 is a plan view of one embodiment of the present invention illustrating a pet toy such as a dog chew in an expanded condition.
Figure 5:
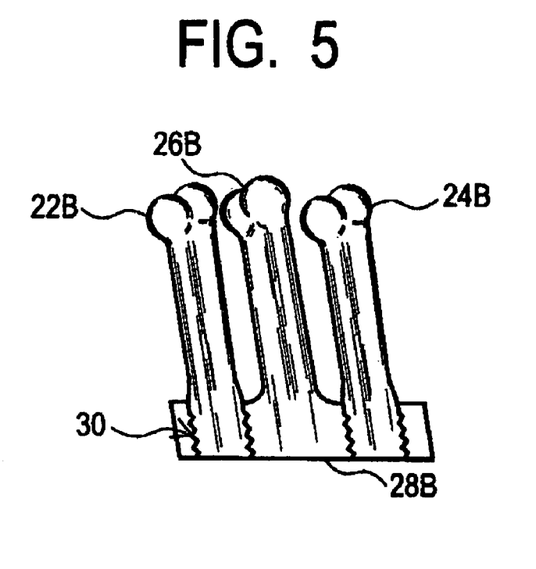
FIG. 5 illustrates an alternate joint design containing teeth which may act as a detent mechanism.

FIG. 3 illustrates a plan view of one embodiment of the present invention. As shown, a dog toy 20 for chewing comprises a plurality of legs 22, 24 and 26. The legs 22, 24 are capable of preferably, rotary, movement around a base 28 which is preferably an extension of leg 26. Each of the legs 22 and 24 form a rotary joint with the base 28 of leg 26 such that when molded, all three legs 22, 24, 26 may be formed in the same plane. FIG. 5 shows a similar toy just after molding. Sometime after molding and cooling, the legs 22, 24 may be rotated on the base 28 of leg 26 to splay outward forming a toy or chew which is easy for a dog to access and chew upon.

Figure 3A:
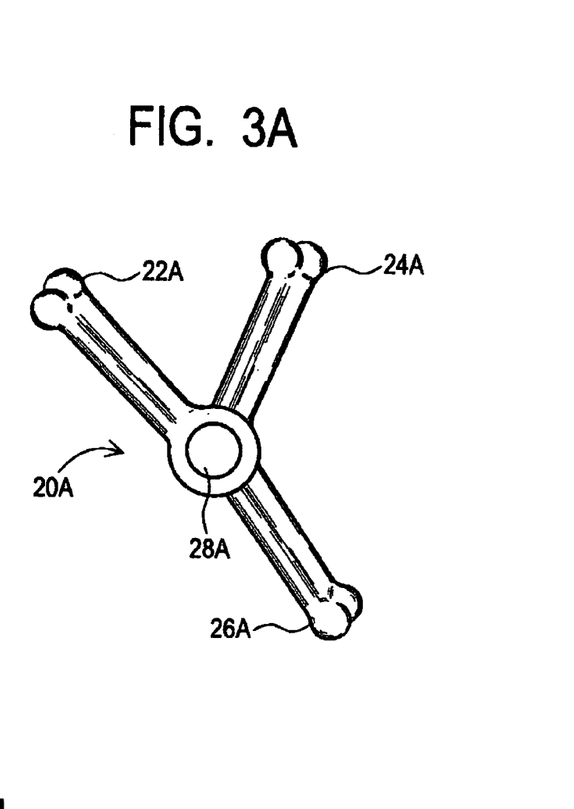
FIG. 3A is a side or end view of the dog chew of FIG. 3 showing the spatial relationship between the three extending legs.

FIG. 3A is a side or end view of FIG. 3 showing one spatial relationship possible with the three legs. Here, it can be seen that the base projects out at each end of the toy 20A to hold the legs 22A, 24A in place. It is contemplated that more than three legs or extensions from the base may be desired, and further that the legs may be of different sizes, shapes, compositions, flavors, scents, etc.

Figure 4:
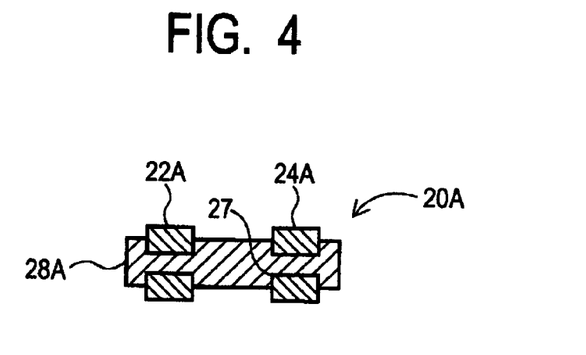
FIG. 4 is a cross-sectional view of FIG. 3 taken along line A—A.

FIG. 4 is a cross-sectional view taken along line A—A of FIG. 3, which illustrates how the rotary joints allow the legs 22A and 24A to lock onto base 28A and still allow rotary movement. The rotary joint is formed in a slotted area of reduced cross-section of the base 28.

Turning to FIG. 5, as alternate joint design is illustrated wherein the base potion 28B and legs 22B and 24B each include a matching set of teeth 30 that may engage to allow more precise and solid location of the legs relative to one another such that a positional or angled relationship may be maintained. The saw tooth pattern may be molded into both the base portion 28B and the leg portion 22B, 24B such that the teeth on each portion engage one another to prevent free rotation. Alternatively, other intermeshing designs than a saw tooth may be used to form a detent configuration, including but not limited to, square wave and scalloped designs.

Figure 6:
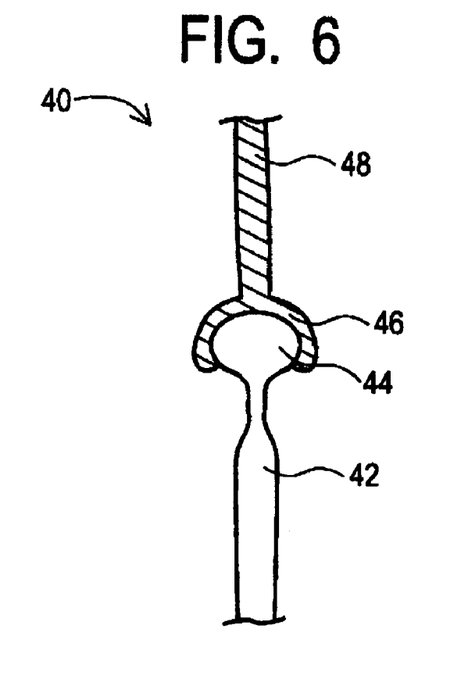
FIG. 6 is a cross-sectional view illustrating an alternate joint design.

FIG. 6 illustrates an alternate embodiment of a joint design 40 of the present invention which has a ball and socket relationship allowing for additional degrees of freedom over the rotary design of FIGS. 3 and 4. Here, a leg portion 42 includes a ball portion 44. Surrounding at least a portion of the ball member is a socket portion 46 which is part of another leg portion 48. Alternately, more than one socket portion having a narrow width may be formed on a single ball member to permit additional legs to extend from the ball portion. Again, the plurality of legs may all be molded in a single flat plane and some time after demolding may be articulated to various angles as allowed by the shape of the socket portion 46 overlying the ball portion 44.

Figure 7:
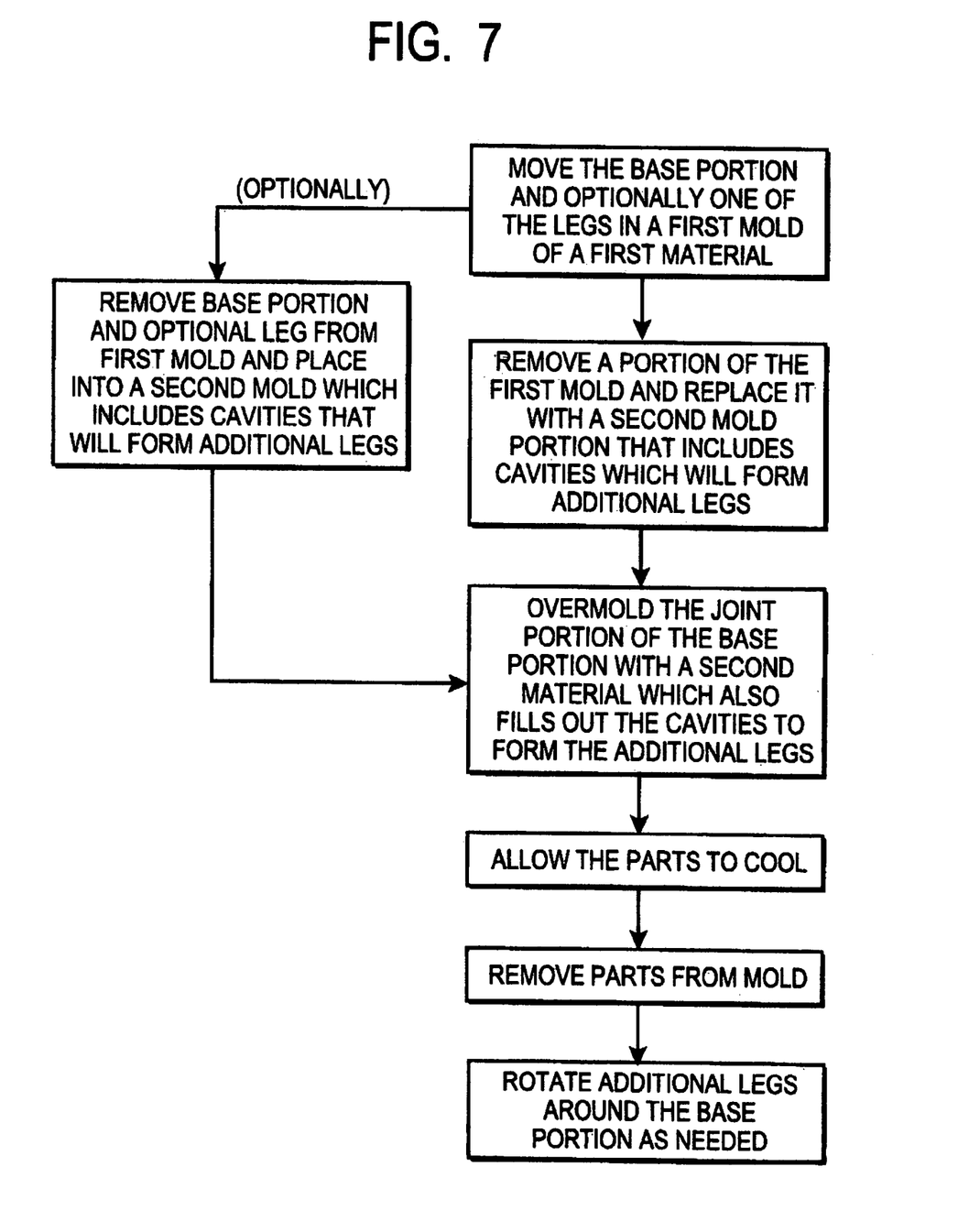
FIG. 7 is a block diagram listing the sequential steps for producing the articles of the present invention.

Turning now to the method for preparing the pet toys of the present invention, FIG. 7 is a chart listing the steps to produce the articles of the present invention.

As noted, using a first material, the base portion of the pet toy preferably including one or more joint regions is molded. Preferably, this process involves injection molding but may include, but not be limited to, casting, transfer molding, reaction injection molding, compression molding, etc. The molding of the base portion 28 in FIG. 1 may include one or more extensions or legs 26 and further includes areas of reduced diameter, shown at 27 in FIG. 4. These slots 27 extend at least partially around the base 28 and allow an over-molded second material to solidify in the slot 27 to lock the additional legs 22 and 24 (see FIG. 1) onto the base portion 28. Once the base portion 28 has solidified, a portion of the mold which formed the base portion 28 is removed and a second mold portion having cavities for legs 22 and 24 is positioned against the remaining portion of the first mold. Alternatively, the base portion 28 and adjoining leg 26 molded of the first material may be removed from the first mold and placed into a second mold which has been designed to tightly hold the leg 26 and place the base portion 28 into one or more cavities where it can be partially overmolded with a second material. As earlier noted, the joint portion 30 of the base portion 28 may include a notched or toothed surface which when overmolded with a second material will form detents which may require additional force to move the legs 22 and 24 to rotate around the base portion 28.

There are several preferred techniques to prevent adhesion of the second material to the first material in the joint regions. For example, the first material and second material are preferably of incompatible compositions such that little or no adhesion occurs by the overmolding. In this regard, the incompatible nature is broadly defined as surfaces which do not otherwise adhere to one another in view of their chemical or physical nature. With respect to chemical characteristics, this would include two polymer materials that have different solubility parameters, which is typically used to define the capacity of one material to actually dissolve in another. Therefore, it has been found that if the solubility parameters are different, one can expect that the surfaces of the molded materials will tend not to adhere. With respect to physical considerations, it is of course preferable to employ materials that have relatively low coefficients of friction so that the surfaces will not adhere, for example polyethylene to polyethylene, or polyamide to polyamide, etc.

In connection with the present invention, it can also be appreciated that one preferable technique to engage two different polymer materials is to provide for the feature of shrinkage of the second material onto the base portion of the first material after overmolding, thereby providing some resistance to free rotation of legs 22 and 24 relative to leg 26. This allows the legs 22, 24 and 26 to be positioned relative to one another, without collapse.

An alternate method for reducing adhesion of the second material to the first material, which may be used alone or in combination with the use of incompatible materials as described above, includes the use of quite different melt points for the materials being molded. This ensures that the base portion (first material) does not melt when overmolded with the second material and that adhesion does not occur. In one instance, the base portion (first material) may be molded of a high meltpoint or of a thermosetting resin and the overmolded second material be of a resin some 25 degrees C. or lower in melt point. In this manner, for instance, the base portion may be molded of a nylon having a melt point around 200 degrees C. and the overmolded portion may comprise a thermoplastic urethane having a melt point around 175 degrees C. or lower. Alternatively, many of the cellulose, amylose and starch-containing compositions are readily processed at 120 degrees to 150 degrees C. and are useful herein as preferred overmolded materials. This then may allow for the inclusion of a wide variety of sweeteners, vitamins, herbs, flavorings and colors into any of the plurality of legs of the present invention to provide variety for the dog.

A still further alternative to reduce adhesion between the first material forming the base portion and the second overmolded material in the joint region involves the use of abherents or "mold releases". In this instance, upon removal of the base portion from the first mold, or removal of a portion of the first mold which forms the base portion, a "mold release" may be applied, generally by spraying, to the area, in this case the joint region 27, 30 of the base portion 28, to prevent adhesion of the second material. Typical materials used in the art as mold releases or abherents include lecithin, silicone, fluoropolymers, soaps, etc.

A still further alternative is to include within the first material an internal mold release (IMR) which migrates to the outer surface upon solidification of the first plastic material. Internal mold release agents are typically fatty acid esters and amides, silicones and waxes. Use of this type of abherent prevents adhesion from occurring between the joint region of the base portion comprising the first material and the overmolded second material which forms the remainder of the rotary or ball and socket joint.

Figure 8:
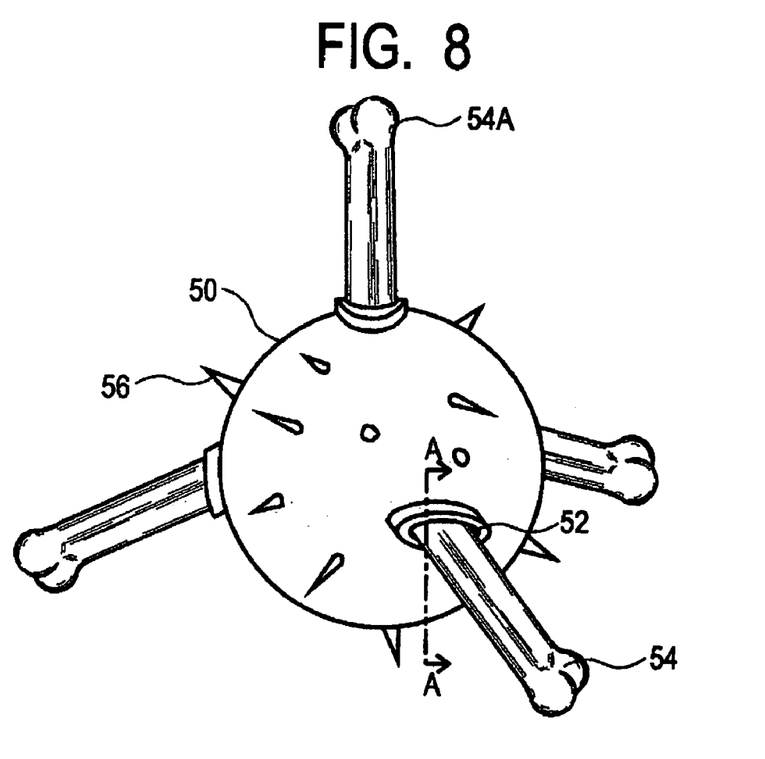
FIG. 8 is another embodiment of the present invention illustrating a three-dimensional pet chew assembled from component parts.

FIG. 8 illustrates a further alternative embodiment of the present invention assembled from separately molded components engaged into a base. A molded base 50 is prepared which contains openings 52 for accommodating a plurality of components 54, preferably in the form of animal chew, such as a dog bone. The base 50 therefore contains openings 52 that preferably frictionally engage the components 54 so that they may be conveniently inserted and retained with the base portion. In one particularly preferred embodiment the openings 52 are in the form of slot which contains a plurality of opposed ridges which engage the inserted component 54. In this fashion, by selectively engaging a different number of ridges, the pull force to remove the component 54 may be conveniently regulated. This may be accomplished by the user who selectively may insert the component a desired distance, depending upon the type of animal that may be intended to use the chew or toy. The base 50 may have any shape but is preferably essentially round and may have openings 52 disposed at any angle from the base. In a most preferred embodiment, the base 50 is spherical as shown in FIG. 8, contains a plurality of small projections 56 for the animal to grip or chew on, and has four legs 54 projecting outward at approximately equal angles such that in any orientation, one leg 54A projects essentially perpendicular to the surface that the base 50 is sitting upon. This provides a toy which is easy for the animal to access and manipulate. The legs of the toy may comprise any combination of shapes, compositions, flavors, scents, etc. to provide the animal variety in enjoying the toy. Further, with this particular embodiment, it is relatively easy to exchange the legs to provide variety in chewability, flavor, vitamins or nutrients, shape and size. For example, the components may comprise starch, rawhide, or any other edible material so that the components that may be consumed by the animal can be replaced.

In addition, it should be noted that preferably projecting components 54 are spaced from one another and project outwardly from the base 50 such that one of said components projects in a generally vertical configuration relative to the base. Furthermore, the vertical projection may project at an angle of about 45–90 degrees relative to the base, and at all incremental angles therebetween. In addition, it is also preferred that two of the components project outward from the base and define an angle between such components in the range of about 90–180 degrees, and at all incremental angles therebetween. It is also particularly preferred that the base contain four openings and four components, wherein the components are substantially equally spaced from one another.

Figure 9:
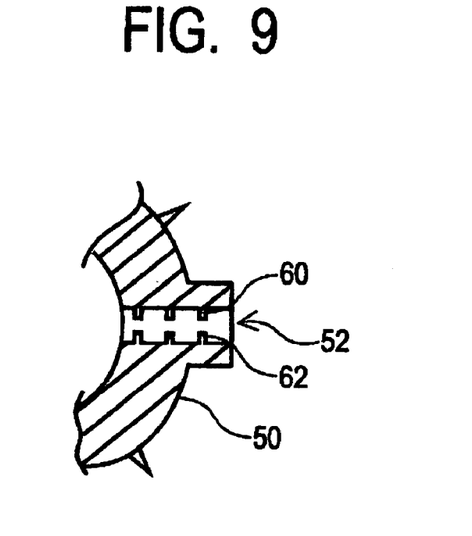
FIG. 9 is a cross-sectional view of one of the opening in the base portion in FIG. 8.

FIG. 9 illustrates a series of opposed ridges 60, 62 that engage a component or leg that may be inserted into the opening 52. Accordingly the base 50 and opposed ridges 60 and 62 may be made from an elastomeric material, such as natural or synthetic rubber. In fact, any polymeric material that provides elastomeric behavior is contemplated. Such elastomeric behavior can be defined as any material which flexible engages and releasably retains the inserted component in the base 50.

The present invention thus provides a novel method for forming pet toys, such as dog chews, etc. in a single flat plane which provides reduced shipping and packaging costs for the product. When the product is ready to be used, it can be unfolded, articulated, rotated or assembled to form a product which a dog may more easily access and enjoy.

In conclusion, therefore, it is seen that the present invention and the embodiments disclosed herein and those covered by the appended claims are well adapted to carry out the objectives and obtain the goals set forth. Certain changes can be made in the subject matter without departing from the spirit and scope of the invention. It is realized that changes are possible within the scope of this invention and it is further intended that each element or step recited in any of the following claims is to be understood as referring to all equivalent elements or steps. The following claims are therefore intended to cover the invention as broadly as legally possible in whatever form it may be utilized.

What is claimed is:

1. An articulated pet toy comprising:
a base portion forming a part of the pet toy including joint regions,
a plurality of legs each including a complimentary joint region which engages said base portion at each said joint region wherein each said joint region comprises a rotary joint which directly engages said base portion,
wherein said base portion is molded of a first material and said legs are molded of a second material, and
wherein said legs may be moved relative to said base portion by movement of said legs relative to the base portion in each said joint region.

2. The pet toy of claim 1 wherein said first material and said second material have a different solubility parameter.

3. The pet toy of claim 2 wherein either of said first or said second material is thermoplastic and the other is thermosetting plastic.

4. The pet toy of claim 1 wherein the first material has a first melting point and the second material has a second melting point and wherein first melting point is greater than second melting point.

5. The pet toy of claim 1 wherein an abherent is applied to the one or more joint regions of the base portion to reduce adhesion of the second material to the first material.

6. The pet toy of claim 5 wherein said abherent is an external mold release.

7. The pet toy of claim 1 wherein either of said first or said second material includes an internal mold release.

* * * * *